United States Patent

[11] 3,597,823

| [72] | Inventor | Averd G. Nelson<br>6611 Wazeecha Ave, Wisconsin Rapids, Wis. 54494 |
|---|---|---|
| [21] | Appl. No. | 795,309 |
| [22] | Filed | Jan. 30, 1969 |
| [45] | Patented | Aug. 10, 1971 |

[54] PINCH-ON FISHING SINKER APPLIER AND ASSEMBLY
10 Claims, 6 Drawing Figs.

[52] U.S. Cl. ............................................. 29/200 B,
29/212, 72/410
[51] Int. Cl. ............................................. B23p 19/00
[50] Field of Search ...................................... 29/200 B,
212 D, 212 P, 200 R, 203 D; 72/410

[56] References Cited
UNITED STATES PATENTS

| 2,736,026 | 2/1956 | Belokin, Jr. | 29/212 D |
|---|---|---|---|
| 2,765,686 | 10/1956 | Deline | 72/410 |
| 2,791,925 | 5/1957 | Peters | 29/212 X |
| 2,842,993 | 7/1958 | Thomas | 72/410 |
| 3,172,319 | 3/1965 | Stanfield | 72/410 |
| 3,371,400 | 3/1968 | Edes | 29/212 D |

Primary Examiner—Thomas H. Eager
Attorney—Andrus, Sceales, Starke & Sawall

ABSTRACT: A fisherman's sinker having a split opening is gripped in a hinged throwaway pincher having legs provided with flanges which hold the sinker in place. When a fisherman's line is placed in the split opening of the sinker, the pincher legs are pushed together to close the opening onto the line. The pincher may then be removed and thrown away.

Patented Aug. 10, 1971
3,597,823
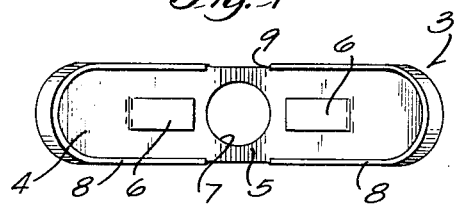
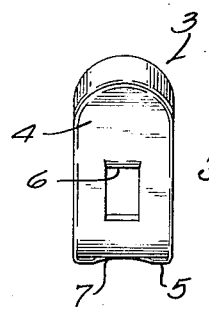
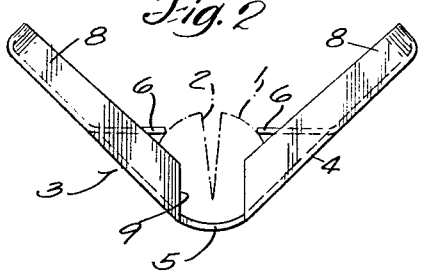
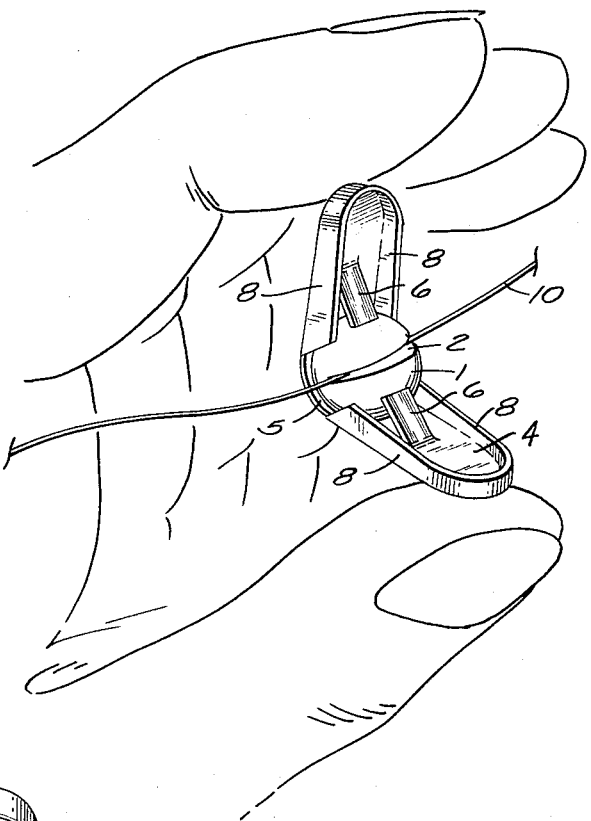
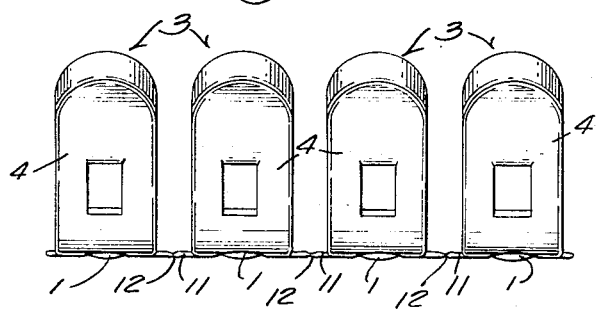
Inventor
Averd G. Nelson
Attorneys

PINCH-ON FISHING SINKER APPLIER AND ASSEMBLY

This invention relates to a pinch-on fishing sinker applier and assembly, and more particularly to a device for applying a sinker to a fishing line or leader.

Most fisherman utilize a sinker on their line to cause the hook to be lowered into the water. These sinkers have often comprised a small lead ball or pellet which is partially split to form an opening into which the fishing line can be inserted. The ball is then pinched onto the line.

Heretofore, no simple way of pinching the sinker has been found. It sometimes can be done by hand, but often requires considerable strength and can be painful. Plierlike pincher devices have also been utilized, but they are costly and subject to being lost.

The present invention solves the aforementioned problems and provides a simple, inexpensive applying device which is purchased as a unit with the sinker already attached. The device includes means for pinching the split sinker onto the line and which then may be thrown away.

The accompanying drawing illustrates the best mode presently contemplated by the inventor for carrying out the invention.

In the drawing:

FIG. 1 is a top plan view of a sinker applier constructed in accordance with the invention;

FIG. 2 is a side elevation of the sinker applier and with the sinker shown in phantom;

FIG. 3 is a bottom plan view of the sinker applier;

FIG. 4 is a right end view of the sinker applier;

FIG. 5 is a perspective view of the applier, showing the manner of the pinch-on application of the sinker to a fishing line; and FIG. 6 is a side elevation of a multiassembly unit.

As shown in the drawing, the invention is contemplated for use in connection with a fishing sinker 1 having a closeable split opening 2 therein. Sinker 1 may be made of any suitable material, such as lead, which is soft enough to permit permanent pinch closing of opening 2. While sinker 1 is shown in the form of a ball, other shapes may possibly be used without departing from the spirit of the invention.

In accordance with the invention, sinker 1 is adapted to be held or gripped by a cliplike pincher 3 which provides the means for pinching opening 2 closed. For this purpose, pincher 3 comprises an elongated body having a base 4 which is bent transversely at its approximate midsection to form a curved hinge portion 5 which joins two angularly disposed legs. Each leg is provided with an inwardly extending flange 6, with each flange facing toward each other and toward hinge 5. As shown, opposed flanges 6 may be formed from a cutout portion of base 4.

The hinge portion 5 of pincher 3 may have an opening 7 therein, and each leg may have an inwardly extending rim 8, with rims 8 being separated at the hinge area to form a transverse slot 9, for purposes to be described.

Pincher 3 should be made of a material which permits bending thereof at the hinged portion 5. Soft metal or some plastics would be suitable.

Assuming that sinker 1 and pincher 3 are manufactured for sale as a unitary assembly, sinker 1 is placed within the pincher so that it is seated in opening 7 to prevent sidewards shifting of the sinker. Rims 8 also assist in this regard. Split opening 2 should be positioned so that it faces upwardly, or away from hinge 5. The legs of pincher 3 should then be brought together just enough to cause flanges 6 to permanently engage and grippingly hold the sinker in place without closing opening 2.

As shown in FIG. 5, a fisherman who wishes to apply a sinker to his line 10, places the line in the split opening 2 of the sinker, and then squeezes the pincher legs together, whereby hinge 5 will bend and flanges 6 will approach each other and force opening 2 to close on the line. This is not difficult, since the pincher legs provide lever means.

Pincher 3 is then released by pulling the legs apart to reverse bend hinge 5 and separate flanges 6 from sinker 1. The pincher, being small and inexpensive, may be thrown away.

If desired, a plurality of sinker-holding pinchers may be manufactured and sold as a multiassembly unit. As shown in FIG. 6, a plurality of such pinchers 3 with sinkers 1 held therein are integrally connected by strips 11 which connect hinges 5. Strips 11 are breakable such as at scores 12, to facilitate separating individual pinchers from the unit as desired.

The invention provides a simple and inexpensive throwaway pincher for fisherman's sinkers.

Various modes of carrying out the invention are contemplated by the inventor.

The following claims particularly point out and distinctly claim the subject matter which is regarded as the invention.

I claim:

1. A unitary sinker-pincher assembly for applying a sinker to a fisherman's line, comprising:
   a. a sinker having a closeable split opening therein for receiving the said line,
   b. and a unitary pincher permanently engaging and gripping said sinker with said split opening in open position, said pincher including:
      1. a pair of angularly disposed legs joined by a bendable hinge,
      2. and holding means gripping said sinker in seated engagement on said hinge,
   c. said holding means also providing means for closing said split opening when said legs are pinched together.

2. The assembly of claim 1:
   in which said holding means comprises opposed flanges on said legs with said flanges in gripping engagement with said sinker.

3. The assembly of claim 1 wherein said hinge has an opening therein in which said sinker seats.

4. The assembly of claim 1 in which said pincher includes:
   an inwardly extending rim on each leg with said rims being separated adjacent said hinge to form a transverse slot for receiving a fisherman's line.

5. The assembly of claim 4 in which said holding means comprises opposed flanges on said legs with said flanges in gripping engagement with said sinker.

6. A unitary pincher unit for a fisherman's sinker having a closeable split opening, comprising:
   a. a base forming a pair of angularly disposed legs,
   b. a bendable hinge joining said legs,
   c. and a pair of opposed flanges extending inwardly from said legs and facing toward said hinge for permanently engaging and gripping a sinker,
   d. pinching of said legs together causing said hinge to bend so that said flanges will approach each other.

7. The pincher unit of claim 6 which includes an inwardly extending rim on each said leg with said rims being separated adjacent said hinge to form a transverse slot for receiving a fisherman's line.

8. The pincher unit of claim 6 in which an opening is disposed in said hinge for seating a sinker gripped by said flanges.

9. A unitary pincher unit for a fisherman's sinker having a closeable split opening, comprising:
   a. a base forming a pair of legs,
   b. a bendable hinge joining said legs,
   c. an inwardly extending rim on each said leg with said rims being separated adjacent said hinge to form a transverse slot for receiving a fisherman's line,
   d. and a pair of opposed flanges extending inwardly from said legs and facing toward said hinge for permanently engaging and gripping a sinker,
   e. said hinge having an opening therein for seating a sinker gripped by said flanges,
   f. pinching of said legs causing said hinge to bend so that said flanges will approach each other.

10. A multiassembly sinker pincher unit comprising:

a. a plurality of sinker pinchers for closing the split openings of fisherman's sinkers onto fishing lines, with each sinker pincher comprising:
1. a base forming a pair of legs,
2. a bendable hinge joining said legs,
3. a pair of opposed flanges extending inwardly from said legs and facing toward said hinge for permanently engaging and gripping a sinker,
4. pinching of said legs causing said hinge to bend so that said flanges will approach each other, b. and a breakable connecting strip joining the hinges of adjacent sinker pinchers.